United States Patent [19]

Postle et al.

[11] Patent Number: 4,481,252

[45] Date of Patent: Nov. 6, 1984

[54] SHEET MATERIAL

[75] Inventors: Stephen R. Postle, Brentwood; James Doyle, Wickford, both of England

[73] Assignee: Ciba-Geigy AG, Basel, Switzerland

[21] Appl. No.: 442,993

[22] Filed: Nov. 19, 1982

[30] Foreign Application Priority Data

Dec. 10, 1981 [GB] United Kingdom ............... 8137238

[51] Int. Cl.$^3$ .............................................. B44D 5/00
[52] U.S. Cl. ................................... 428/323; 428/327; 428/412; 428/484; 428/478.2; 428/910
[58] Field of Search ............ 428/910, 327, 412, 484, 428/485, 508, 515, 323

[56] References Cited

U.S. PATENT DOCUMENTS

| | | | |
|---|---|---|---|
| 3,067,352 | 12/1962 | Vodicka et al. | 428/508 X |
| 3,264,136 | 8/1966 | Hedge | 428/327 |
| 3,340,089 | 9/1967 | Bougie | 428/484 X |
| 3,706,593 | 12/1972 | Miyano et al. | 428/331 X |
| 3,720,534 | 3/1973 | Macaulay et al. | 428/327 |
| 3,779,800 | 12/1973 | Heiser | 428/327 |
| 4,133,688 | 1/1979 | Sack | 428/327 X |
| 4,211,437 | 7/1980 | Myers et al. | 428/327 X |

Primary Examiner—George F. Lesmes
Assistant Examiner—Nancy A. B. Swisher
Attorney, Agent, or Firm—Joseph G. Kolodny

[57] ABSTRACT

A transparent sheet material which is suitable for projection on overhead projectors comprises coated onto a support a binder layer containing discrete particles of an organic polymer which has substantially the same refractive index as the binder, the polymer comprising from 0.5 to 30% by weight of the binder.

The coating gives a good key for typewritten characters produced by carbon ribbon or ink ribbon typewriters, for writing with e.g. ball-point pen, pencil, water or solvent based ink pens, Indian ink and inked rubber stamps.

8 Claims, No Drawings

SHEET MATERIAL

This invention relates to a transparent sheet material which can be used for projection on overhead projectors.

The use of overhead projectors has increased greatly in recent years and thus the demand for sheet materials or foils or slides to be used with these projectors has also increased. These foils may be imaged with pictures, graphs or most often alphanumeric symbols. The most usual method of forming an alphanumeric symbol on projection foils is to produce a typed or printed sheet and then to photocopy the type or printed sheet on a positive working photographic sheet or to use thermographic copying material.

These methods are both costly and time consuming. We have found transparent flexible sheet material onto which alphanumeric symbols can be applied by a typewriter directly or from a photosensitive plate in a xerographic copying machine and which is at once suitable for projection on an overhead projector.

According to the present invention there is provided a transparent sheet material on which is coated a transparent binder layer having dispersed therein colourless organic polymer beads of from 0.5 $\mu$m to 40 $\mu$m in size and which have substantially the same refractive index as the binder, the organic polymer beads comprising from 0.5 to 30% by weight of the binder.

The preferred particle size range is from 1.5 $\mu$m to 5 $\mu$m.

The preferred layer thickness of the binder layer which comprises the polymer beads is from 0.5 $\mu$m to 20 $\mu$m.

Preferably the layer thickness of the binder layer is just slightly less than the mean average particle size of the polymer beads.

By transparent layer or support is meant that the layer or support has a light scattering effect of less than 0.2 density units between 400 and 700 nonometers under the projection conditions.

Finely divided toothing agents are used in drafting films to provide a tooth to the surface of the film to enable it to be marked with a pencil or an aqueous based ink. However, drafting films must of necesstity be opaque or only slightly translucent.

However, it is important in the sheet material according to the present invention that it should be as transparent as possible. To this end the binder and the toothing agent are selected to have substantially the same refractive index, "binder" in this context being taken to mean the matrix in which the toothing agent is embedded and which holds it onto the sheet. A particularly good combination of binder and toothing agent for use in the present invention is gelatin as the binder and small beads of polymethylmethacrylate as the toothing agent. By small in this context is meant a particle-size distribution wherein 75% of the particles are bigger than 2 $\mu$m and 100% are less than 40 $\mu$m.

The refractive index of gelatin is 1.515–1.530 and that of polymethylmethacrylate is 1.493.

It is possible to modify gelatin to alter its refractive index and thus a combination of polystyrene beads which have a refractive index of 1.59 and a modified gelatin having a similar refractive index can be used. A number of chemical modified gelatins which can be used according to the present invention is described, for example, in U.S. Pat. No. 3,923,517. Disclosed are e.g. reaction products of gelatin and isocyanates, aziridines, sulfonyl halides, acid anhydrides, oxirane compounds or active halogen containing compounds.

It is possible also to use as the binder a mixture of gelatin and a polymer latex to provide a binder having an appropriate refractive index for the chosen polymer beads.

Latices can also be used as the binding agent for the polymer beads. It is possible to prepare latices with refractive indices to match other useful organic polymer beads for example beads of poly-p-methylstyrene, polyethylmethacrylate, polyvinylchloride, polyacrylonitrile and polymethacrylo-nitrile. Other homo- and co-polymers of the above listed polymers whose glass transition temperature is 65 or greater are also of use in the present invention.

An example of such a suitable combination is a latex of styrene/butylacrylate having a refractive index of 1.53 with beads of polymethylmethacrylate.

The thickness of the dried binder layer is from 0.5 $\mu$m to 20 $\mu$m. When the binder is gelatin this is equivalent to a coating weight of from 3 to 50 mg/dm$^2$.

It is important that parts of the surface of the toothing agent used should protrude above the surface of the coated binder layer to provide a toothing surface. This is accomplished if from 0.5 to 30% by weight of the binder of toothing agent is used. The toothing agents are translucent but because of their comparatively small particle size are not completely transparent. Thus their presence in the binder causes the binder layer to exhibit a slight bloom. Thus the more toothing agent present in the binder layer the greater the bloom and the less the absolute transparency of the material.

It has been found that inorganic toothing agents for example silica render the coated layer very susceptible to marking and scratching especially when the foils is being imaged in a typewriter. Further the presence of silica in the binder layer renders the layer very brittle and liable to exhibit creases and other handling marks.

Suitable supports for use in the inventive sheet materials are biaxially oriented polyester polystyrene and polycarbonate and cellulose triacetate and cellulose acetate butyrate. Biaxially oriented polyester, polystyrene and polycarbonate are hydrophobic and thus require a surface treatment to render their surfaces capable of being coated with a binder layer. Such treatments are well-known in the field of the preparation of photographic film base and include for example treatment of the support with a phenolic solvent or by corona discharge treatment followed by the coating of a subbing layer.

One particular utility of the material according to the present invention is that it can be placed in a typewriter and be typed on as a piece of typing paper on the coated side or sides. The ribbon used in the typewriter can be a carbon black throw-away ribbon or a re-usable inked ribbon. The alphanumeric symbols produced by the typewriter on the material adhere well to the surface of the material and the typewritten material can be used in an overhead projector to magnify and project the typewritten symbols.

The other particular utility of the material of the present invention is that it can be used as the plain copying sheet in a xerographic copying apparatus wherein a selenium or similar photosensitive plate has formed thereon an electrostatic image, carbon powder is coated over the photosensitive plate to form a carbon powder image and the carbon powder image is transferred to the plain copy sheet.

However, the material according to the present invention can also be marked by pencil, wax-based coloured crayons and both solvent and water-based inks. Furthermore, it is able to accept dry-transfer alphanumeric symbols, lines and geometric shapes, as well as water-based paints.

It is not necessary that the image formed on the material on the present invention has a high visual contrast as long as it prevents the passage of light during projection. For example pencil markings are a pale grey colour but project as a good black image due to light-scattering.

Preferably however, in order to render the material capable of receiving the full range of markings a tacking agent, for example a sugar such as sucrose or a polypeptide is present in the binder.

Also there may be present in the binder other additives for example a dye to provide a coloured background where such dye may be bleached or undergo a colour change for example to provide a highlight to the projected image, bacteriocide to act as a preservative, especially if gelatin is used as the binder, a hardening agent, for the binder, a u.v.-absorbing agent or an optical brightening agent, together with an antioxidant or other preserving agent.

The material according to the present invention may be a sheet of the type usually used in an overhead projector that is to say in the region of 29.7 cm by 21 cm. However, in a presentation using an overhead projector it is often desirable to project on the screen a single word in order to emphasize a point. It is rather a waste of the expensive material to use a 29.7 cm by 21 cm sheet thus, the invention also includes narrow strips or slides of coated film base for example 35 mm wide strips. Single words or very short messages can be typed thereon or be applied thereon from an electrostatic copying machine and the part of the strip bearing the applied symbols can then be stuck on an uncoated clear plastics material base sheet, which is comparatively cheap, for viewing in an overhead projector, or mounted in a slide holder.

The following examples will serve to illustrate the invention.

EXAMPLE 1

2.3 g of gelatin is swelled in 20.7 g of water and dissolved at 45° C. To this solution are added 0.16 g of the sodium salt of an alkyl naphthalene sulphonate, 0.77 g of polymethylmethacrylate beads (mean particle size 3 $\mu$m, 99% of the particles between 0.5 $\mu$m and 40 $\mu$m), 0.57 g of glyoxal and 96.2 g of water. This mixture is coated at 40° C. onto a clear polyester base (100 $\mu$m thick) which had been subbed for coating. The coating is air dried to give a coating with coating weights of 12 mg/dm$^2$ of gelatin and 4 mg/dm$^2$ of polymethylmethacrylate.

The refractive index of gelatin is 1.500 and that of polymethylmethacrylate is 1.493.

The coated side of the material has a sentence typed on it using a carbon ribbon in an electric typewriter producing clear black letters on the transparent background which cannot be rubbed off.

Sheets of the coated material are placed in the paper tray of a Xerox 3600 electrostatic copying machine and have copied on to them a line diagram. This diagram adhered well to the base.

The visual contracts of both these sheets are measured and found to be greatly in excess of 2 which is the difference required to give a good image when projected.

Furthermore, the coated material gives a good key for writing with ball-point penn, pencil of "HB" or "B" grade, water or solvent based ink pens, indian ink and dry transfer symbols. The coating also receives characters produced by inked rubber stamps and finger prints produced by inked fingertips.

EXAMPLE 2

A butylacrylate/styrene latex is prepared by emulsifying by stirring in the presence of the wetting agent a mixture of 18.6 g of butylacrylate and 21.2 g of styrene in 50 g of water and initiating the polymerisation, at 70° C. under nitrogen, with 0.13 g of sodium persulphate. The latex so prepared contains 47% by weight of solids. The refractive index of the latex is 1.53.

A mixture of 29.0 g of this latex and 9.0 g of polymethylmethacrylate beads (mean particle size 3 $\mu$m, 99% of particles between 0.5 $\mu$m and 40 $\mu$m) and 62 g of water is coated at 25° C. into a clear polyester base (100 $\mu$m thick), which has been subbed for coating. The coating is dried by air impingement at 110° C.

This coating gives a good key for typewritten characters produced by carbon ribbon or ink ribbon typewriters. It also gives a good key for writing with ball-point pen, pencil of "HB" or "B" grade, water or solvent based ink pens, Indian ink and dry transfer symbols. The coating also receives characters produced by inked rubber stamps and finger prints produced by inked finger tips.

We claim:

1. A transparent sheet material, which comprises coated onto a transparent support, a transparent binder layer having dispersed therein colourless organic polymer beads of from 0.5 $\mu$m to 40 $\mu$m in size and which have substantially the same refractive index as the binder, the organic polymer beads comprising from 0.5 to 30% by weight of the binder and the binder being gelatin, modified gelatin or a mixture of gelatin and a polymer latex.

2. A material according to claim 1, wherein the particle size range of the polymer beads is from 1.5 $\mu$m to 5.0 $\mu$m.

3. A material according to claim 1, wherein the layer thickness of the binder layer is from 0.5 $\mu$m to 20 $\mu$m.

4. A material according to claim 3, wherein the layer thickness of the binder layer is just slightly less than the mean average particle size of the polymer beads.

5. A material according to claim 1, wherein the binder is gelatin and the organic polymer is polymethylmethacrylate in bead form.

6. A material according to claim 1, wherein the material of the support is cellulose triacetate, cellulose acetate-butyrate or subbed biaxially oriented polyester, polystyrene or polycarbonate.

7. A material according to claim 1 which has on at least one surface alphanumeric symbols which have been applied by typing using a carbon ribbon or which have been applied in a xeroxgraphic copying machine.

8. A process for the preparation of a transparent sheet material according to claim 1, which comprises coating onto a transparent sheet material a transparent binder layer having dispersed therein colourless organic polymer beads of from 0.5 $\mu$m to 40 $\mu$m in size and which have substantially the same refractive index as the binder, the organic polymer beads comprising from 0.5 to 30% by weight of the binder, and the binder being gelatin, modified gelatin or a mixture of gelatin with a polymer latex.

* * * * *